Figure 1:
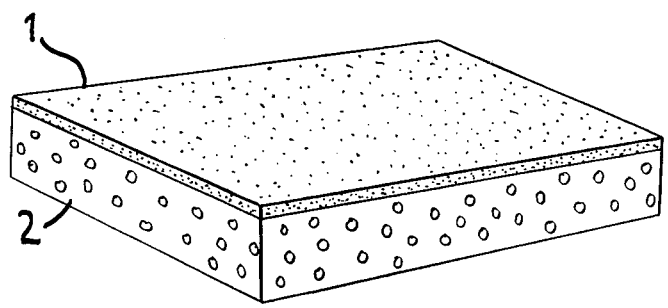

United States Patent
Christenson et al.

[15] 3,663,401
[45] May 16, 1972

[54] CONTROL OF WATER-SOLUBLE ACIDS IN AN ELECTRODEPOSITION BATH

[72] Inventors: Roger M. Christenson; Louis R. Lebras, both of Gibsonia, Pa.

[73] Assignee: PPG Industries, Inc., Pittsburgh, Pa.

[22] Filed: Oct. 13, 1970

[21] Appl. No.: 80,374

Related U.S. Application Data

[63] Continuation-in-part of Ser. No. 814,789, Apr. 9, 1969.

[52] U.S. Cl. ...................................................204/181
[51] Int. Cl. .................................B01k 5/02, C23b 13/00
[58] Field of Search .................................................204/181

[56] References Cited

UNITED STATES PATENTS

| | | |
|---|---|---|
| 3,444,066 | 5/1969 | Brewer et al. ................204/181 |
| 3,496,083 | 2/1970 | Kawai et al. .................204/181 |
| 3,528,901 | 9/1970 | Wallace et al. ..............204/181 |
| 3,556,970 | 1/1971 | Wallace et al. ..............204/181 |

*Primary Examiner*—Howard S. Williams
*Attorney*—Chrisholm and Specer

[57] ABSTRACT

This invention relates to a method of controlling water-soluble acids present in a base-solubilized electrodepositable composition, which comprises subjecting the bath to a selective filtration process such as ultrafiltration and thereby removing water-soluble acids from the bath.

21 Claims, 2 Drawing Figures

Patented May 16, 1972 3,663,401

INVENTORS
ROGER M. CHRISTENSON
LOUIS R. LE BRAS

BY Christenson and Spencer

ATTORNEYS

CONTROL OF WATER-SOLUBLE ACIDS IN AN ELECTRODEPOSITION BATH

CROSS-REFERENCE TO RELATED APPLICATIONS

This application is a continuation-in-part of copending application Ser. No. 814,789, filed Apr. 9, 1969.

STATE OF THE ART

Electrodeposition has become a widely commercially accepted commercial coating technique. The coatings achieved have excellent properties for many applications and virtually any conductive substrate may be coated by electrodeposition. In the electrodeposition process, the articles to be electro coated are immersed in an aqueous dispersion of a solubilized, ionized film-forming material such as a synthetic organic vehicle resin. An electric current is passed between the article to be coated, serving as an electrode, and a counter electrode to cause deposition of the coating of the vehicle resin on the article. The article is then withdrawn from the bath, usually rinsed and then the coating either air-dried or baked in the manner of the conventional finish.

The major problem in a continuous electrodeposition process has been the control of the electrodeposition bath to maintain the initial paint properties. It has been found that as tanks operate, chemicals from various sources tend to accumulate in the electrodeposition bath. One such material is the low molecular weight organic acids and especially formic acid. The presence of low molecular weight acids and especially formic acid, generally present as salts, in electrodeposition baths tends to increase the conductivity of the bath and cause film roughness, thin films, staining, pin-holing, low rupture voltage and poor salt spray resistance.

DESCRIPTION OF THE INVENTION

It has now been found that exceptional control of the bath composition and removal of water-soluble acids, usually in the form of salts of the solubilizing base, from base-solubilized electrodepositable compositions can be achieved by a selective filtration process, that is, a process which selectively removes low molecular weight materials from the bath.

A preferred selective filtration process is an ultrafiltration process, which separates materials below a given molecular size from the electrodeposition bath. With a properly selected membrane, this treatment does not remove pigment or desired resin from the paint in the tank but does remove water-soluble acids from the electrodeposition bath in a ratio proportional to their concentration in the water phase of the bath.

A number of electrodepositable resins are known and can be employed to provide the electrodepositable compositions which may be treated by the process of this invention. Virtually any water-soluble, water-dispersible or water-emulsifiable polyacid resinous material can be electrodeposited and, if film-forming, provides coatings which may be suitable for certain purposes. Any such electrodepositable composition is included among those which can be employed in the present invention, even though the coating obtained might not be entirely satisfactory for certain specialized uses.

Presently, the most widely used electrodeposition vehicle resins are synthetic polycarboxylic acid resinous materials. Numerous such resins are described in U.S. Pat. Nos. 3,441,489; 3,422,044; 3,403,088; 3,369,983 and 3,366,563, which are incorporated by reference. These include a reaction product or adduct of a drying oil or semi-drying oil fatty acid ester with a dicarboxylic acid or anhydride. By drying oil or semi-drying oil fatty acid esters are meant esters of fatty acids which are or can be derived from drying oils or semi-drying oils, or from such sources as tall oil. Such fatty acids are characterized by containing at least a portion of polyunsaturated fatty acids. Preferably, the drying oil or semi-drying oil per se is employed.

Also included among such esters are those in which the esters themselves are modified with other acids, including saturated, unsaturated or aromatic acids or an anhydride thereof. The acid-modified esters are made by transesterification of the ester, as by forming a di- or mono-glyceride by alcoholysis, followed by esterification with the acid; they may also be obtained by reacting oil acids with a polyol and reacting the acid with the partial ester. In addition to glycerol, alcoholysis can be carried out using the other polyols such as trimethylolpropane, pentaerythritol, sorbitol and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols, are also useful.

Also included within the terms "drying oil fatty acid esters" as set forth herein are alkyd resins prepared utilizing semi-drying or drying oils; esters of epoxides with such fatty acids, including esters of diglycidyl ethers of polyhydric compounds as well as other mono-, di- and poly-epoxides, semi-drying or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha, beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances it requires more stringent conditions than the unsaturated dicarboxylic acid anhydrides or acids which form such anhydrides. Mixtures of the above acids or anhydrides may also be utilized. Generally speaking, the anhydride or acid employed contains from four to 12 carbon atoms, although longer chain compounds can be used if so desired.

While the reaction products can be comprised solely of adducts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion and which may have other similar desirable characteristics.

As shown in the art, it is preferred that in certain instances the neutralization reaction be carried out in such a manner that amido groups are attached to part of the carbonyl carbon atoms derived from the dicarboxylic acid or anhydride. Compositions within this general class are described in U.S. Pat. Nos. 3,366,563 and 3,369,983.

Another vehicle comprises the fatty acid ester, unsaturated acid or anhydride reaction products and any additional unsaturated modifying materials (as described above) which are further reacted with the polyol.

Essentially any polyol can be employed, but diols are preferred. When higher polyols, such as trimethyolopropane, glycerol, pentaerythritol and the like are utilized, they are employed in small amounts, or in conjunction with the diol, or in the presence of a monohydric alcohol, and are used with adducts having a relatively low proportion of acidic component. Water-insoluble diols are often preferable, and especially desirable water-dispersed compositions for electrodeposition are obtained using 2,2-bis(4-hydroxycyclohexyl)propane (which has given the best results), neopentyl glycol, 1,1'-isopropylidene-bis(p-phenyleneoxy)di-2-propanol and similar diols.

The proportions of the polyol and ester-anhydride adduct which are employed depend upon various factors, but are in general limited only by the need to avoid gelation of the product. The total functionality of the reactants is a guide to determining the optimum proportions to be employed, and in most instances should not be greater than about 2.

In many instances, only part of the anhydride groups of the adduct, e.g., about 10 percent, are reacted with the polyol. Of those anhydride groups reacted, it is preferred that only one of the carboxyl groups is esterified in each instance.

The product contains a substantial part of the original acidity derived from the dicarboxylic acid or anhydride; ordinarily the product should have an acid number of at least about 20. To provide a water-dispersed product, such as is used in electrodeposition processes, at least part of the remaining acidic groups are neutralized by reaction of the partially-esterified product with a base.

The polyol reaction products and reaction conditions are more fully described in application Ser. No. 450,205, filed Apr. 22, 1965, now U.S. Pat. No. 3,565,781 as well as in the art cited above.

Another type of electrodepositable coating composition which gives desirable results are the water-dispersible compositions comprising at least partially neutralized interpolymers of unsaturated carboxylic acids and at least one other monomer, usually an acrylic ester and particularly interpolymers of hydroxyalkyl esters of unsaturated carboxylic acids, unsaturated carboxylic acids and at least one other ethylenically unsaturated monomer. These are employed in the composition along with an amine-aldehyde condensation product, with the interpolymer usually making from about 50 percent to about 95 percent by weight of the resinous composition.

The acid monomer of the interpolymer is usually acrylic acid or methacrylic acid, but other ethylenically unsaturated monocarboxylic and dicarboxylic acids of up to about six carbon atoms can also be employed. The hydroxyalkyl ester is usually hydroxyethyl or hydroxypropyl acrylate or methacrylate, but also desirable are the various hydroxyalkyl esters of the above acids having, for example, up to about five carbon atoms in the hydroxyalkyl radical. Mono- or diesters of the dicarboxylic acids mentioned are included. Ordinarily, the acid and ester each comprise between about 1 percent and about 20 percent by weight of the interpolymer, with the remainder being made up of one or more other copolymerizable ethylenically-unsaturated monomers. The most often used are the alkyl acrylates, such as ethyl acrylate; the alkyl methacrylates, such as methyl methacrylate; and the vinyl aromatic hydrocarbons, such as styrene, but others can be utilized.

The above interpolymer is at least partially neutralized by reaction with a base as described above; at least about 10 percent and preferably 50 percent or more of the acidic groups are neutralized, and this can be carried out either before or after the incorporation of the interpolymer in the coating composition.

The amine-aldehyde condensation products included in these compositions are, for example, condensation products of melamine, benzoguanamine, or urea with formaldehyde, although other amine-containing amines and amides, including triazines, diazines, triazoles, guanadines, guanamines and alkyl and aryl-substituted derivatives of such compounds can be employed, as can other aldehydes, such as acetaldehyde. The alkylol groups of the products can be etherified by reaction with an alcohol, and the products can be water-soluble or organic solvent-soluble.

Electrodeposition compositions comprising the above interpolymers and an amine-aldehyde resin are more fully described in U.S. Pat. No. 3,403,088.

Still another electrodepositable composition of desirable properties comprises an alkyd-amine vehicle, that is, a vehicle containing an alkyd resin and an amine-aldehyde resin. A number of these are known in the art and may be employed.

Preferred are water-dispersible alkyds such as those in which a conventional alkyd (such as a glyceryl phthalate resin), which may be modified with drying oil fatty acids, is made with a high acid number, e.g., 50 to 70, and solubilized with ammonia or an amine, or those in which a surface-active agent, such as a polyalkylene glycol, e.g., "Carbowax," is incorporated. High acid number alkyds are also made by employing a tricarboxylic acid, such as trimellitic acid or anhydride, along with a polyol in making the alkyd.

The above alkyds are combined with an amine-aldehyde resin, such as those described hereinabove. Preferred are water-soluble condensation products of melamine or a similar triazine with formaldehyde with subsequent reaction with an alkanol. An example of such a product is hexakis-(methoxymethyl)melamine.

The alkyd-amine compositions are dispersed in water and they ordinarily contain from about 10 percent to about 50 percent by weight of amine resin based on the total resinous components.

Yet another electrodepositable composition of desirable properties comprises mixed esters of a resinous polyol. These resin esters comprise mixed esters of an unsaturated fatty acid adduct. Generally the polyols which are utilized with these resins are essentially any polyol having a molecular weight between about 500 and 5,000. Such resinous polyols include those resinous materials containing oxirane rings which can be opened in, prior to, or during the esterification reaction to provide an apparent hydroxy site. The vehicle resins are formed by reacting a portion of the hydroxyl groups of the polyol with the fatty acid, the ratio of the reactions being such that at least an average of one hydroxyl group per molecule of the polyol remains unreacted. The remaining functionality is then reacted with the unsaturated fatty acid adduct of an olefinically unsaturated dicarboxylic anhydride, such as maleic anhydride, this second esterification reaction being conducted under conditions so that esterification occurs through the anhydride ring, thereby introducing free acid groups into the molecule. Mixed acids of the class described are disclosed in Belgian Pat. No. 641,642, as well as copending application Ser. No. 568,144, filed July 27, 1966 now abandoned.

In order to produce an electrodepositable composition, it is necessary to at least partially neutralize the acid groups present with a base in order to idsperse the resin in the electrodeposition bath. Inorganic bases such as metal hydroxides, especially potassium hydroxide, can be used. There may likewise be used ammonia or organic bases, especially water-soluble amines, such as, for example, the mono-, di- and tri-lower alkyl amines such as methylamine, ethylamine, propylamine, butylamine, dimethylamine, diethylamine, dipropylamine, dibutylamine, and m-methyl-butylamine, triethylamine, tributylamine, methyldiethylamine, dimethylbutylamine, and the like; cyclic amines such as morpholine, pyrrolidine, piperidine; diamines such as hydrazine, methylhydrazine, 2,3-toluene diamine, ethyl diamine and piperizine and substituted amines such as hydroxylamine, ethanolamine, diethanolamine, butanolamine, hexanolamine and methyldiethanolamine, octanolamine, diglycolamine and other polyglycolamines, triethanolamine, and methylethanolamine, n-amino-ethanolamine and methyldiethanolamine and polyamines such as diethylene triamines.

There may be present in the electrodepositable composition any of the conventional types of pigments employed in the art. There is often incorporated into the pigment composition a dispersing or surface-active agent. Usually the pigment or surface-active agent, if any, are ground together in a portion of the vehicle, or alone, to make a paste and this is blended with the vehicle to produce a coating composition.

In many instances, it is preferred to add to the bath in order to aid dispersibility, viscosity and/or film quality, a non-ionic modifier or solvent. Examples of such materials are aliphatic, naphthenic and aromatic hydrocarbons or mixtures of the same; mono- and dialkyl ethers of glycols, pine oil and other solvents compatible with the resin system. The presently preferred modifier is 4-methoxy-4-methyl-pentanone-2 (Pent-Oxone).

There may also be included in the coating composition, if desired, additives such as antioxidants, for example, orthoamylphenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines, or their amides, esters of sodium isothionates, alkyl phenoxy-polyethylene alkanols, or phosphate esters including ethoxylated alkylphenol phosphates. Other additives which may be employed include anti-foaming agents, suspending agents, bactericides, and the like.

In formulating the coating composition, ordinary tap water may be employed. However, such water may contain a relatively high level of metals and cations which, while not rendering the process inoperative, these cations may result in variations of properties of the baths when used in electrodeposition. Thus, in common practice, deionized water, i.e., water from which free ions have been removed by the passage through ion exchange resins, is invariably used to make up the coating compositions of the instant invention.

In addition to the electrodepositable vehicle resins described above, there may be present in the electrodepositable composition other resinous materials which are non-carboxylic acid materials. For example, as shown above, there may be added up to about 50 percent by weight of an amine-aldehyde condensation product.

Other base-solubilized polyacids which may be employed as electrodeposition vehicles include those taught in U.S. Pat. No. 3,392,165, which is incorporated herein by reference, wherein the acid groups rather than being solely polycarboxylic acid groups, contain mineral acid groups such as phosphoric, sulfonic, sulfate and phosphate groups.

The polyacids are anionic in nature and are dispersed or dissolved in water with alkaline materials such as amines or alkaline metal hydroxides and, when subjected to an electric current, they migrate to the anode.

The water-soluble organic acids or their salts removed by the process of the invention may be derived from numerous sources such as internal contaminants; residues; or unreacted materials utilized in resin preparation or resin decomposition problems, chiefly aldehydes from aldehyde-derived resins, which aldehydes oxidize to form water-soluble acids; or materials added for a specific purpose to the bath which have decomposed, forming water-soluble acids.

Chief among the water-soluble acids which may be treated by the process of this invention is formic acid. Formic acid may be present in the electrodeposition bath from many sources. Two principal sources of formic acid contamination in electrodeposition baths are, first, oxidation of formaldehyde contributed by amine-formaldehyde, urea-formaldehyde or phenol-formaldehyde resins utilized as crosslinking resins in numerous electrodepositable compositions and, secondly, oxidation of formaldehyde utilized as a bacterial or fungus control agent to control the growth of bacteria or fungus in an electrodeposition bath. Conventionally, formaldehyde present in an electrodeposition bath is oxidized to form formic acid. This oxidation is frequently accelerated by other materials in the bath and especially chromate ions usually contributed by a metal pretreatment process, as well as from chromate pigments utilized in the coating compositions.

As previously stated, any water-soluble acid, and especially organic acids, particularly formic acid, may be removed from the electrodeposition bath by selective filtration process, which separates materials below a given molecular weight size from the electrodeposition bath. Since the acids are usually present in the form of salts of the solubilizing base, soluble salts of low molecular weight acids, which acids themselves have limited solubility, can also be removed by the process of the invention. However, if the pH of the electrodeposition material is sufficiently low, at least some water-soluble acid per se may be present in the bath and will be removed by the process described herein. The principally-preferred method of separation is ultrafiltration.

Ultrafiltration may be defined as a method of concentrating solute while removing solvent, or selectively removing solvent and low-molecular weight solute from a significantly higher molecular weight solute. From another aspect, it is a process of separation whereby a solution containing a solute of molecular dimensions significantly greater than the solvent is depleted of solute by being forced under a hydraulic pressure gradient to flow through a suitable membrane. The first definition is the one which most fittingly describes the term "ultrafiltration" as applied to an electrodeposition bath.

Ultrafiltration thus encompasses all membrane-moderated, pressure-activated separations wherein solvent or solvent and smaller molecules are separated from modest molecular weight macromolecules and colloids. The term "ultrafiltration" is generally broadly limited to describing separations involving solutes of molecular dimensions greater than about 10 solvent molecular diameters and below the limit of resolution of the optical microscope, that is, about 0.5 micron. In the present process, water is considered the solvent.

The principles of ultrafiltration and filters are discussed in a chapter entitled "Ultrafiltration" in the spring, 1968, volume of ADVANCES IN SEPARATIONS AND PURIFICATIONS, E. S. Perry, Editor, John Wiley & Sons, New York, as well as in CHEMICAL ENGINEERING PROGRESS, Vol. 64, December, 1968, pages 31 through 43, which are hereby incorporated by reference.

The basic ultrafiltration process is relatively simple. Solution to be ultrafiltered is confined under pressure, utilizing, for example, either a compressed gas or liquid pump in a cell, in contact with an appropriate filtration membrane supported on a porous support. Any membrane or filter having chemical integrity to the system being separated and having the desired separation characteristic may be employed. Preferably, the contents of the cell should be subjected to at least moderate agitation to avoid accumulation of the related solute on the membrane surface with the attendant binding of the membrane. Ultrafiltrate is continually produced and collected until the retained solute concentration in the cell solution reaches the desired level, or the desired amount of solvent or solvent plus dissolved low molecular weight solute is removed. A suitable apparatus for conducting ultrafiltration is described in U.S. Pat. No. 3,495,465, which is hereby incorporated by reference.

There are two types of ultrafiltration membrane. One is the microporous ultrafilter, which is a filter in the traditional sense, that is, a rigid, highly-voided structure containing interconnected random pores of extremely small average size. Through such a structure, solvent (in the case of electrodeposition, water) flows essentially viscously under a hydraulic pressure gradient, the flow rate proportional to the pressure difference, while dissolved solutes, to the extent that their hydrated molecule dimensions are smaller than the smallest pores within the structure, will pass through, little impeded by the matrix. Larger size molecules, on the other hand, will become trapped therein or upon the external surface of the membrane and will thereby be retained. Since the microporous ultrafilters are inherently susceptible to internal plugging or fouling by solute molecules whose dimensions lie within the pore size distribution of the filter, it is preferred to employ for a specific solute a microporous ultrafilter whose mean pore size is significantly smaller than the dimensions of the solute particle being retained.

In contrast, the diffusive ultrafilter is a gel membrane through which both solvent and solutes are transported by molecular diffusion under the action of a concentration or activity gradient. In such a structure, solute and solvent migration occur via random thermal movements of molecules within and between the chain segments comprising the polymer network. Membranes prepared from highly hydrophilic polymers which swell to eliminate standard water are the most useful diffusive aqueous ultrafiltration membrane. Since a diffusive ultrafilter contains no pores in the conventional sense and since concentration within the membrane of any solute retained by the membrane is low and time-independent, such a filter is not plugged by retained solute, that is, there is no decline in solvent permeability with time at a constant pressure. This property is particularly important for a continuous concentration or separation operation. Both types of filters are known in the art.

The presently preferred ultrafilter is an anisotropic membrane structure, such as illustrated in FIG. 1. This structure consists of an extremely thin, about one-tenth to about 10 micron layer, of a homogeneous polymer 1, supported upon a thicker layer of a microporous open-celled sponge 2, that is, a layer of about 20 microns to about 1 millimeter, although this dimension is not critical. If desired, this membrane can be further supported by a fibrous sheet, for example, paper, to provide greater strength and durability. These membranes are used with a thin film or skin side exposed to the high pressure solution. The support provided to the skin by the spongy substrate is adequate to prevent film rupture.

Membranes useful in the process are items of commerce and can be obtained by several methods. One general method is described in Belgian Pat. No. 721,058. This patent describes a process which, in summary comprises (a) forming a casting dope of the polymer in an organic solvent, (b) forming a film of the casting dope, and (c) preferentially contacting one side of said film with a diluent having high compatibility with the casting dope to effect precipitation of the polymer immediately upon coating the cast film with the diluent.

The choice of a specific chemical composition for the membrane is determined to a large extent by its resistance to the chemical environment. Membranes can be typically prepared from thermoplastic polymers such as polyvinyl chloride, polyacrylonitrile, polysulfones, poly(methyl methacrylate), polycarbonates, poly(n-butyl methacrylate), as well as a large group of copolymers formed from any of the monomeric units of the above polymers, including "Polymer 360," a polysulfone copolymer. Cellulosic materials such as cellulose acetate may also be employed as membrane polymers.

Some examples of specific anisotropic membranes operable in the process of the invention include Diaflow membrane ultrafilter PM—30, the membrane chemical composition of which is a polysulfone copolymer, Polymer 360, and which has the following permeability characteristics:

Solute Retention Characteristics

| Solute | Molecular Weight | % Retention |
|---|---|---|
| Raffinose | 594 | 0 |
| Bacitracin | 1,400 | 20 |
| Cytochrome C | 12,400 | 0 |
| Myoglobin | 17,800 | 65 |
| Pepsin | 35,000 | 85 |
| Ovalbumin | 45,000 | >95 |
| Albumin | 67,000 | 100 |
| Dextran 110 | 110,000 | 20 |

Flow Rate—ml./min.

| Membrane Diameter | Pressure P.S.I. | Distilled Water | 0.25% Pepsin (35,000 mw) In Distilled Water (55 psi) |
|---|---|---|---|
| 25 mm. | 55 | 8.6 | 1.1 |
| 150 mm. | 55 | 350 | 46.0 |

The membrane is chemically-resistant to acids ($HCl$, $H_2SO_4$, $H_3PO_4$, all concentrates), alkalis, high phosphate buffer and solutions of common salts as well as concentrated urea and guanadine hydrochloride. The membrane is solvent-resistant to alcohol, acetone and dioxane. The membrane is not solvent-resistant to dimethylformamide or dimethyl sulfoxide. This membrane is hereinafter referred to as "Membrane A."

Dorr-Oliver XPA membrane, the membrane chemical composition of which is Dynel (an acrylonitrile-vinyl chloride copolymer) and which has the following permeability characteristics:

| Solute | Molecular Weight | Percent Retention | Flux (gal./sq.ft./day at 30 psi, 1.0% solute |
|---|---|---|---|
| Cytochrome C | 12,600 | 50 | 100 |
| αChymotripsinagen | 24,000 | 90 | 22 |
| Ovalbumin | 45,000 | 100 | 45 |

This membrane is hereinafter referred to as "Membrane B."

Dorr-Oliver BPA type membrane, the membrane chemical composition of which is phenoxy resin (polyhydroxy ether), and which has the following permeability characteristics:

| Solute | Molecular Weight | Percent Retention | Flux (gal./sq.ft./day at 30 psi, 1.0% solute |
|---|---|---|---|
| Cytochrome C | 12,600 | 50 | 30 |

This membrane is hereinafter referred to as "Membrane C."

Figure 2:
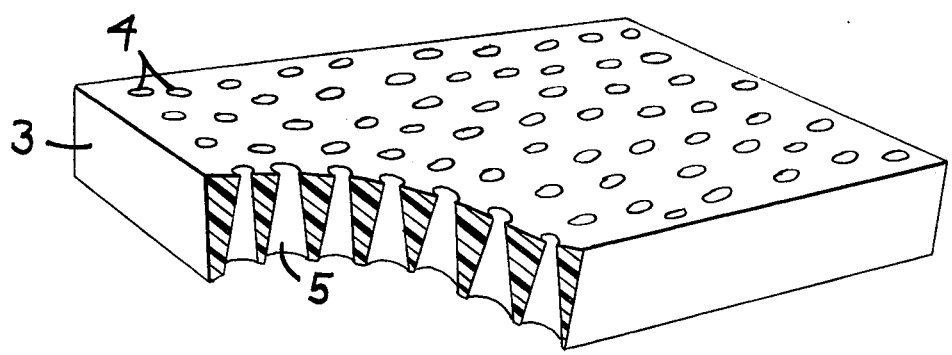

The microporous ultrafilters are generally isotropic structures, thus flow and retention properties are independent of flow direction. It is preferred to use an ultrafilter which is anisotropic in its microporous membrane structure, FIG. 2. In such a membrane, the pore size increases rapidly from one face to the other. When the fine-textured side 4 is used in contact with the feed solution, this filter is less susceptible to plugging since a particle which penetrates the topmost layer cannot become trapped in the membrane because of the larger pore size 5 in the substrate.

The process of the invention may be operated as either a batch or a continuous process. In batch selective filtration or batch ultrafiltration a finite amount of material is placed in a cell which is pressurized. A solvent and lower molecular weight solutes are passed through the membrane. Agitation is provided by a stirrer, for example, a magnetic stirrer. Obviously, this system is best used for small batches of material. In a process requiring continuous separation, a continuous selective filtration process is preferred. Using this technique, material is continuously recirculated under pressure against a membrane or series of membranes through interconnecting flow channels, for example, spiral flow channels.

Likewise, the ultrafiltration process may be conducted as either a concentration process or a diafiltration process. Concentration involves removing solvent and low molecular weight solute from an increasingly concentrated retentate. Filtration flow rate will decrease as the viscosity of the concentrate increases. Diafiltration, on the other hand, is a constant volume process whereby the starting material is connected to a reservoir or pure solvent, both of which are placed under pressure simultaneously. Once filtration begins, the pressure source is shut off in the filtration cell and thus, as the filtrate is removed, an equal volume of new solvent is introduced into the filtration cell to maintain the pressure balance. The configuration of the filter may also vary widely and is not limiting to the operation of the process. The filter or membrane may, for example, be in the form of a sheet, tubes or hollow fiber bundles, among other configurations.

Under ideal conditions, selected low molecular weight solutes would be filtered as readily as solvent and their concentration in the filtrate is equal to that in the retentate. Thus, for example, if a material is concentrated to equal volumes of filtrate and retentate, the concentration of low molecular weight solute in each would be the same.

Using diafiltration, retentate solute concentration is not constant and the mathematical relationship is as follows:

$$ln(C_{io}/C_i) = V_s/V_o$$

where $C_{io}$ is the initial solute concentration, $C_i$ is the final solute concentration of the retentate, $V_s$ is the volume of solute delivered to the cell (or the volume of the filtrate collected), and $V_o$ is the initial solution volume (which remains constant).

Electrodepositable compositions, while referred to as "solubilized," in fact are considered a complex solution, dispersion or suspension or combination of one or more of these classes in water, which acts as an electrolyte under the influence of an electric current. While, no doubt, in some circumstances the vehicle resin is in solution, it is clear that in some instances and perhaps in most the vehicle resin is a dispersion which may be called a molecular dispersion of molecular size between a colloidal suspension and a true solution.

The typical industrial electrodepositable composition also contains pigments, are crosslinking resins and other adjuvants which are frequently combined with the vehicle resin in a chemical and a physical relationship. For example, the pigments usually ground in a resin medium and are thus "wetted" with the vehicle resin. As can be readily appreciated then, an electrodepositable composition is complex in terms of the freedom or availability with respect to removal of a component or in terms of the apparent molecular size of a given vehicle component.

As applied to the process of this invention, ultrafiltration comprises subjecting an electrodepositable composition, especially after it has been employed in a coating process or aged, which inherently causes contaminants and other low molecular weight materials to accumulate in the bath, such as metal pretreatment chemicals, water, absorbed $CO_2$ (either dissolved or, more likely, combined as an aminic salt or carbonate), neutralizing agent, organic solvent and ions such as formate, chromate, phosphate, chloride and sulfate, for example, to an ultrafiltration process employing an ultrafilter, preferably a diffusive membrane ultrafilter selected to retain the solubilized vehicle resin while passing water and low molecular weight solute, especially those with a molecular weight below about 500. As previously indicated, the filters discriminate as to molecular size rather than actual molecular weight, thus these molecular weights merely establish an order of magnitude rather than a distinct molecular weight cut-off. Likewise, as previously indicated, the retained solutes may, in fact, be colloidal dispersions or molecular dispersions rather than true solutes.

In practice, a portion of the electrodepositable composition may be continuously or intermittently removed from the electrodeposition bath and passed under pressure created by a pressurized gas or by means of pressure applied to the contained fluid in contact with the ultrafilter. Obviously, if desired, the egress side of the filter may be maintained at a reduced pressure to create the pressure difference.

The pressures necessary are not severe. The maximum pressure, in part, depends on the strength of the filter. The minimum pressure is that pressure required to force water and low molecular weight solute through the filter at a measurable rate. With the presently preferred membranes, the operating pressures are between about 10 and 150 p.s.i., preferably between about 25 and 75 p.s.i. Under most circumstances, the ultrafilter should have an initial flux rate, measured with the composition to be treated of at least about 3 gals./sq.ft./day (24 hours) and preferably at least about 4.5 gal./sq.ft./day.

As previously indicated, the bath composition should be in motion at the face of the filter to prevent the retained solute from impeding the flow through the filter. This may be accomplished by mechanized stirring or by fluid flow with a force vector to the filter surface.

The retained solutes comprising the vehicle resin are then returned to the electrodeposition bath. If desired, the concentrate may be reconstituted by the addition of water either before entry to the bath or by adding water directly to the bath.

If there is present in the bath desirable materials which, because of their molecular size, are removed in the ultrafiltration process, these may likewise be returned to the bath either directly to the retained solute before entry to the bath, in the makeup feed as required, or independently.

Water soluble acidity, as utilized herein, describes that acidity which remains in the aqueous phase, when the resins, pigment, and other water insoluble components are separated therefrom, for example, when an electrodepositable composition is acidified and the non-soluble materials precipitate or are centrifuged from the aqueous phase. Ultrafiltration also can be used to separate water soluble acids, usually in the form of salts of the solubilizing base, which can then be identified by techniques involving separating the components of the ultrafiltrate by known analytical techniques and identifying the components by infrared spectra, gas chromatography and/or by comparison with known compounds.

The following examples set forth specific embodiments of the instant invention. However, the invention is not to be construed as being limited to these embodiments for there are, of course, numerous possible variations and modifications. All parts and percentages in the examples, as well as throughout the specification, are by weight unless otherwise specified.

EXAMPLE I

The electrodepositable composition utilized in this example was a white pigmented composition with a pigment to binder ratio of 0.4/1 solubilized to 50 percent theoretical neutralization with triisopropanolamine; reduced to 9 percent solids with deionized water for electrocoating, the vehicle composition comprised:

75% acrylic resin consisting of:
  74.2% solids formed by polymerizing:
    15.8% methacrylic acid
    10.4% hydroxyethyl acrylate
    24.9% styrene
    48.9% butyl acrylate
  25.8% solvents:
    74.0% ethyl Cellosolve
    18.5% N-butyl ether
    7.5% isopropyl alcohol
  the resin composition having an acid value of 74.0 and a viscosity of 59,200 centipoises.
20% ethoxymethoxymethyl melamine (XM—1116)
5% hydrolyzed epoxy resin comprising:
  32.0% solids:
    100% hydrolyzed Epon 828
  68.0% solvents:
    69.0% butyl Cellosolve
    31.0% deionized water The initial electrodepositable composition at 9.2 percent solids, pH 8.1, was coated over zinc phosphatized steel for 90 seconds at 80° F., 200 volts, air-dried 30 minutes and baked 20 minutes at 350° F. The panels had excellent appearance.

To duplicate long-term stability problems, the initial electrodepositable composition was deliberately contaminated with 300 parts per million formic acid and a panel coated under the same conditions as above showed severe staining and roughness.

The contaminated composition was subjected to batch selective filtration utilizing as a membrane Dorr-Oliver XPA, described as "Membrane B" above. Forty percent of the volume was ultrafiltered and the retentate reconstituted to 9 percent solids with deionized water and 1 percent butyl Cellosolve based on the total bath. Panels coated from the reconstituted composition under the same conditions described above showed good film appearance and an absence of staining or roughness.

EXAMPLE II

The resin composition of this example was a reaction product of 20 percent maleic anhydride and 80 percent linseed oil having a viscosity of 100,000 centipoises at 25° C.

The electrodeposition bath had the following composition:

| | | |
|---|---|---|
| Vehicle non-volatiles: | | 92.6% |
| Maleinized oil | 96.7% | |
| Cresylic acid | 2.9% | |
| Dispersing agent (combination of oil-soluble sulfonate and non-ionic surfactant— Witco 912) | 0.4% | |
| Pigment: | | 7.4% |
| Carbon black | 75.5% | |
| Strontium chromate | 24.5% | |
| Amine | | |
| Diethylamine | 12% (based on total resin solids) | |

The electrodeposition bath was charged at 8 percent solids and contained 1 pound/100 gallons of 37 percent formalin.

After a substantial period of coatings operations with replenishment to maintain the original composition, during which time repeated additions of formalin were made for fungus control, a change in coating properties was noted. What were described as "blobs" or ugly eruptions of thick paint, possibly from localized film rupturing or premature resin coagulation about the anode, were noted.

The above coating composition was subjected to batch ultrafiltration utilizing Membrane A above. Fifty percent of the volume was ultrafiltered and the retentate reconstituted to the original percent solids with deionized water.

| | pH | Conductivity (Micromhos/cm.) |
|---|---|---|
| Original paint | 7.42 | 3000 |
| Reconstituted paint | 7.40 | 2200 |
| Filtrate | 7.72 | 1850 |

Paints coated from the reconstituted material were smooth with no "blobs." There was a reduction in rupture voltage.

A 15 percent ultrafiltration and reconstitution utilizing Membrane B eliminated blobs with no drop in rupture voltage.

The use of Membrane C provides similar results.

The presence of water soluble acidity as the cause of the film problems was confirmed in part as follows:

The diethylamine salt of formic acid, when added to a fresh composition as described above, caused blobs.

The reaction product of formaldehyde and chromate caused blobs in a fresh composition.

The presence of formate in the ultrafiltrate was proven by identifying derivatives in one instance by I.R. and in another by gas chromatography.

By plotting equivalents of formic acid in the first 10 percent of distillate from sulfuric acid acidified, filtered samples of the coating compositions with known formate additions and comparing that with the bath ultrafiltered above, it was determined that the above composition contained about 280 parts per million of formic acid.

Other electrodepositable compositions such as those hereinabove described may be substituted for those exemplified. Likewise, various other filters or membrane means may be employed to obtain the improvements hereinabove described.

According to the provisions of the Patent Statutes, there are described above the invention and what are now considered its best embodiments; however, within the scope of the appended claims, it is to be understood that the invention can be practiced otherwise than as specifically described.

We claim:

1. A method of controlling the composition of an electrodeposition bath comprising base-solubilized synthetic polyacid vehicle resin dispersed in water and containing water-soluble acids and salts which comprises subjecting at least a portion of the electrodeposition bath to an ultrafiltration process wherein the ultrafiltration membrane retains the resin and passes water and solutes of substantially lower molecular size than the resin, thereby removing the water-soluble acid salts, and returning the retentate from the ultrafiltration process to the electrodeposition bath.

2. In a method of operating a continuous electrocoating operation wherein electrically-conductive objects are provided with an organic coating by electrically-induced deposition of organic coating material in which said objects are passed through an aqueous dispersion of said coating material retained in a coating bath, the improvement comprising employing as at least a portion of said aqueous dispersion an aqueous dispersion treated by the method of claim 1.

3. A method as in claim 1 wherein the ultrafiltration process is operated at a pressure gradient between about 10 and about 150 p.s.i. and the ultrafiltration membrane has a flux rate of at least about 4.5 gallons per square foot per day.

4. A method as in claim 1 wherein the water-soluble acid salt removed is a salt of formic acid.

5. In a method of operating a continuous electrocoating operation wherein electrically-conductive objects are provided with an organic coating by electrically-induced deposition of organic coating material in which said objects are passed through an aqueous dispersion of said coating material retained in a coating bath, the improvement comprising employing as at least a portion of said aqueous dispersion an aqueous dispersion treated by the method of claim 4.

6. A method as in claim 1 wherein the polyacid resin is a carboxylic acid resin.

7. A method as in claim 6 wherein the electrodeposition bath has been previously utilized to electrocoat articles.

8. A method as in claim 7 wherein the ultrafiltration process is operated at a pressure gradient between about 10 and about 150 p.s.i. and the ultrafiltration membrane has a flux rate of at least about 4.5 gallons per square foot per day.

9. A method as in claim 8 wherein the ultrafiltration membrane is an anisotropic membrane.

10. A method as in claim 8 wherein the water-soluble acid salt removed is a salt of formic acid.

11. In a method of operating a continuous electrocoating operation wherein electrically-conductive objects are provided with an organic coating by electrically-induced deposition of organic coating material in which said objects are passed through an aqueous dispersion of said coating material retained in a coating bath, the improvement comprising employing as at least a portion of said aqueous dispersion an aqueous dispersion treated by the method of claim 10.

12. A method as in claim 1 wherein the electrodeposition bath contains an aldehyde-derived resin.

13. A method as in claim 12 wherein the ultrafiltration process is operated at a pressure gradient between about 10 and about 150 p.s.i. and the ultrafiltration membrane has a flux rate of at least about 4.5 gallons per square foot per day.

14. In a method of operating a continuous electrocoating operation wherein electrically-conductive objects are provided with an organic coating by electrically-induced deposition of organic coating material in which said objects are passed through an aqueous dispersion of said coating material retained in a coating bath, the improvement comprising employing as at least a portion of said aqueous dispersion an aqueous dispersion treated by the method of claim 12.

15. A method as in claim 12 wherein the polyacid resin is a carboxylic acid resin.

16. In a method of operating a continuous electrocoating operation wherein electrically-conductive objects are provided with an organic coating by electrically-induced deposition of organic coating material in which said objects are passed through an aqueous dispersion of said coating material retained in a coating bath, the improvement comprising employing as at least a portion of said aqueous dispersion an aqueous dispersion treated by the method of claim 15.

17. A method as in claim 15 wherein the ultrafiltration membrane is an anisotropic membrane.

18. A method as in claim 15 wherein the electrodeposition bath has been previously utilized to electrocoat articles.

19. A method as in claim 18 wherein the ultrafiltration process is operated at a pressure gradient between about 10 and about 150 p.s.i. and the ultrafiltration membrane has a flux rate of at least about 4.5 gallons per square foot per day.

20. A method as in claim 19 wherein the water-soluble acid salt removed is a salt of formic acid.

21. In a method of operating a continuous electrocoating operation wherein electrically-conductive objects are provided with an organic coating by electrically-induced deposition of organic coating material in which said objects are passed through an aqueous dispersion of said coating material retained in a coating bath, the improvement comprising employing as at least a portion of said aqueous dispersion an aqueous dispersion treated by the method of claim 20.

* * * * *